(12) United States Patent
Dai

(10) Patent No.: US 7,402,351 B2
(45) Date of Patent: *Jul. 22, 2008

(54) CARBOXYLIC ACID-BASED IONOMER FUEL CELLS

(75) Inventor: Hongli Dai, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 204 days.

This patent is subject to a terminal disclaimer.

(21) Appl. No.: 10/455,884

(22) Filed: Jun. 6, 2003

(65) Prior Publication Data

US 2004/0018411 A1    Jan. 29, 2004

Related U.S. Application Data

(60) Provisional application No. 60/387,464, filed on Jun. 10, 2002.

(51) Int. Cl.
*H01M 8/10* (2006.01)
*H01M 8/04* (2006.01)

(52) U.S. Cl. .............................. 429/13; 429/33; 429/46

(58) Field of Classification Search ................... 429/13, 429/33, 46; 521/27
See application file for complete search history.

(56) References Cited

U.S. PATENT DOCUMENTS

| | | | |
|---|---|---|---|
| 3,282,875 A | | 11/1966 | Connolly et al. |
| 4,358,545 A | | 11/1982 | Ezzell et al. |
| 4,552,631 A | | 11/1985 | Bissot et al. |
| 4,940,525 A | | 7/1990 | Ezzell et al. |
| 5,039,389 A | * | 8/1991 | McMichael ................. 204/282 |
| 5,273,694 A | | 12/1993 | Perusich et al. |
| 5,547,551 A | | 8/1996 | Bahar et al. |
| 5,773,162 A | | 6/1998 | Surampudi et al. |
| 5,773,480 A | | 6/1998 | Stone et al. |
| 6,110,333 A | | 8/2000 | Spethmann et al. |
| 6,130,175 A | * | 10/2000 | Rusch et al. .................... 442/77 |
| 6,248,469 B1 | * | 6/2001 | Formato et al. ................ 429/41 |
| 6,264,857 B1 | | 7/2001 | Kreuer et al. |
| 6,359,019 B1 | | 3/2002 | Stone et al. |
| 6,767,585 B2 | * | 7/2004 | Kerres et al. ................. 427/350 |
| 6,936,365 B2 | * | 8/2005 | Hobson et al. ................ 429/30 |
| 6,977,122 B2 | | 12/2005 | Colombo et al. |
| 2002/0090541 A1 | | 7/2002 | Hobson et al. |
| 2002/0098402 A1 | | 7/2002 | Fan et al. |
| 2003/0044666 A1 | | 3/2003 | Fan et al. |
| 2004/0018411 A1 | * | 1/2004 | Dai ............................. 429/33 |

FOREIGN PATENT DOCUMENTS

| | | |
|---|---|---|
| JP | 2002 105220 | 4/2002 |
| JP | 2002105220 A | * 4/2002 |

OTHER PUBLICATIONS

Kreuer "On the development of proton conducting polymer membranes for hydrogen and methanol fuel cells", Journal of Membrane Science 185 (2001), pp. 29-39.*
C. Yang et al, "Approaches and technical challenges to high temperature operation of proton exchange membrane fuel cells," Journal of Power Sources 103 (2001) pp. 1-9.
A. Schechter et al, "Imidazole and 1-methyl imidazole in phosphoric acid doped polybenzimidazole, electrolyte for fuel cells," Solid State Ionics 147 (2002) pp. 181-187.
J. Sun et al, "Acid-Organic base swollen polymer membranes," Electrochimica Acta 46 (2001) pp. 1703-1708.
O. Savadogo, J. of New Materials for Electrochemical Systems, 1, pp. 47-66, 1998.
"The Determination of Ionization Constants" by Adrian Albert and E. P. Serjeant, p. 4, Chapman and Hall, 1984.
Tricoli, V., Proton and Methanol Transport in Poly(perfluorosulfonate) Membranes Contain Cs+ and H+ Cations, J. Electrochem. Soc., vol. 145, No. 11, p. 3798-3801 (1998).
Hobson, L. J. et al, Modified Nafion 117 as an Improved Polymer Electrolyte Membrane for Direct Methanol Fuel Cells, J. Electrochem. Soc., vol. 148, No. 10, p. A1185-A1190 (2001).
Iwakura, Chiaki et al, Methanol Fuel Cell. IX. Inhibition of the Anodic Oxidation of Methanol by Nitrogen-Containing Compounds, Denki Kagaku Oyobi Kogyo Butsuri Kagaku, vol. 37, No. 1, 1969, pp. 58-62.
Tamura H. et al, Inhibition Effect of Pyridine Homologs on Anodic Oxidation of Methanol, Database CA "Online", Chemical Abstracts Service, Columbus Ohio, US; 1968.
Tamura H. et al, Inhibition Effect of Pyridine Homologs on Anodic Oxidation of Methanol, Database CA "Online", Chemical Abstracts Service, Columbus Ohio, US; 1968, vol. 71(8), pp. 1141-1143.
Estefan R. M., Evaluation of Possible Methanol Fuel Additives for Reducing Engine Wear and/or Corrosion, Society of Automotive Engineers SP-840, 1990, pp. 17-39.

* cited by examiner

*Primary Examiner*—Gregg Cantelmo
(74) *Attorney, Agent, or Firm*—Jane O. Hamby

(57) ABSTRACT

Conductivity of carboxylic acid membranes can be increased for use in fuel cells when the membrane comprises a Lewis base, which has, in its protonated form, a pKa greater than the pKa of the carboxylic acid groups of the membrane. When the invention is employed in direct methanol fuel cells, water transport and methanol crossover though the membrane are decreased compared to conventional direct methanol fuel cells employing sulfonic acid membranes.

7 Claims, No Drawings

CARBOXYLIC ACID-BASED IONOMER FUEL CELLS

FIELD OF THE INVENTION

This invention relates to membrane fuel cells.

BACKGROUND OF THE INVENTION

Fuel cells are generally made up of a cathode in its compartment and an anode in its compartment separated by an ion-exchange membrane that is usually a fluoropolymer having acid groups, e.g. sulfonic acid groups attached to the polymer chain. These are referred to as sulfonic acid ionomers, or, in membrane form, as sulfonic acid membranes. A fuel such as hydrogen or methanol is fed to the anode compartment, where it is oxidized, generating protons, which pass through the membrane and combine with oxygen at the cathode, producing water.

The management of water in the fuel cell, particularly control of water passing from the anode to the cathode side of the membrane, is important, because membrane conductivity is a function of water content and excessive water transport can result in drying out of the anode side of the membrane. In addition water accumulation at the cathode can result in flooding of the cathode, which interferes with cathode functioning and reduces fuel cell performance.

Existing fuel cell sulfonic acid membranes often have higher water transport than is desirable for best operation.

Direct methanol fuel cells (DMFC) use methanol as fuel directly, i.e. without first reforming the methanol to produce hydrogen to be used in the cell, typically use about 1-6% solution of methanol in water. Permeation of methanol through the membrane that separates the anode from the cathode is a problem in direct methanol fuel cells. This is referred to as methanol crossover. Crossover represents a loss of fuel cell efficiency because the crossover methanol is consumed without producing electric current. This direct consumption of methanol at the cathode also adversely affects the functioning of the cathode. Reduction of methanol crossover in direct methanol fuel cells is needed.

Membranes containing carboxylic acid ionomer, present as a layer laminated or coextruded with a layer of sulfonic acid ionomer, are widely used in the chloralkali industry as membrane separators in cells for the electrolysis of brine because of their superior ability to reject anions. These membranes, in chloralkali electrolyzers have lower water transport properties than do sulfonic acid ionomer membranes. However, though carboxylic acid ionomer membranes show acceptable conductivity in the chloralkali environment, where sodium or potassium ions conduct the current through the membrane, their conductivity when protons are the current carriers, as in the case of fuel cells, is very low. It is generally believed that carboxylic acid ionomer membranes are not useful in fuel cells.

SUMMARY OF THE INVENTION

This invention provides a fuel cell comprising anode and cathode and an ionomer membrane having carboxylic acid groups separating the anode and cathode, the membrane comprising a Lewis base that in its protonated form has a pKa greater than the pKa of at least some of the carboxylic acid groups.

This invention provides a process for operating a fuel cell comprising anode and cathode, a membrane having carboxylic acid groups separating the anode and cathode, and fuel supply for supplying fuel to the anode, the process comprising contacting the membrane with a Lewis base that in its protonated form has a pKa greater than the pKa of at least some of the carboxylic acid groups.

DETAILED DESCRIPTION

In the carboxylic acid ionomers employed in a fuel cell in accordance with the present invention, the acid groups are represented by the formula —$CO_2H$. Preferably, the polymer comprises a polymer backbone with recurring side chains attached to the backbone with the side chains carrying the carboxylic acid groups, or more commonly, a precursor such as an alkyl ester of the carboxylic acid. Polymers of this type are disclosed in U.S. Pat. No. 4,552,631 and most preferably have the side chain —O—$CF_2$—$CF(CF_3)$—O—$CF_2CF_2CO_2H$. This polymer can be made by copolymerization of tetrafluoroethylene (TFE) and the perfluorinated vinyl ether $CF_2$=$CF$—O—$CF_2$—$CF(CF_3)$—O—$CF_2CF_2CO_2CH_3$, methyl ester of perfluoro(4,7-dioxa-5-methyl-8-nonenecarboxylic acid) (PDMNM), followed by conversion to carboxylic acid by hydrolysis of the ester. The methyl ester is the preferred since it is sufficiently stable for melt fabrication, such as extrusion, and is hydrolyzed in alkaline solution and ion-exchanged with acid to the carboxylic acid form. In addition to or instead of the TFE comonomer mentioned above, other monomers can be used including hexafluoropropylene, vinyl fluoride, vinylidine fluoride, trifluorethylene, chlorotrifluoroethylene, perfluoro(alkyl vinyl ether), hexafluoroisobutylene (($CH_2$=$C(CF_3)_2$), ethylene, and mixtures thereof.

In a preferred embodiment of the invention illustrated in the Examples which follow, the copolymers of tetrafluoroethylene (TFE) and perfluorovinyl ether (1) (PDMNM) provide ionomers with carboxylic acid groups.

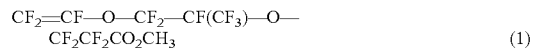

$$CF_2=CF-O-CF_2-CF(CF_3)-O-CF_2CF_2CO_2CH_3 \quad (1)$$

In addition to carboxylic acid ionomer membranes with fluorinated polymer backbones, other carboxylic acid ionomer membranes are suitable in the practice of the present invention. For example, poly(arylene)-etherketones membranes with carboxylic acid groups.

Ionomer membranes employed in fuel cells in accordance with the invention are preferably about 5 μm to about 250 μm thick, preferably about 10 to about 200 μm thick, most preferably about 20 to about 125 μm thick.

Carboxylic acid ionomer membranes employed according to this invention may be of multilayer constructions, such as by lamination or coextrusion with another ionomer, preferably a sulfonic acid ionomer. They may also be made by coating ionomer layers from solution. Multilayer membranes comprised of layers of carboxylic acid and sulfonic acid ionomers are commercially available from E. I. du Pont de Nemours and Company under the trademark Nafion®. In bilayer membranes useful for the practice of the present invention, the carboxylic acid ionomer layer is preferably about 1 to 125 μm thick, more preferably about 1 to 50 μm thick, most preferably about 2 to 25 μm thick; the sulfonic acid ionomer layer is about 5 to 125 μm thick, preferably about 10 to 50 μm thick. The preferred orientation of the bilayer membrane in the fuel cell is with the carboxylic acid ionomer layer toward the anode.

For use in conjunction with carboxylic acid polymer layers in multilayer membranes, a class of preferred sulfonic acid ionomers includes a highly fluorinated, most preferably perfluorinated, carbon backbone and a side chain represented by the formula —(O—CF$_2$CFR$_f$)$_a$—O—CF$_2$CFR'$_f$SO$_3$H, wherein R$_f$ and R'$_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—CF$_2$CF(CF$_3$)—O—CF$_2$CF$_2$SO$_3$H. Polymers of this type are disclosed in U.S. Pat. No. 3,282,875 and can be made by copolymerization of tetrafluoroethylene (TFE) and the perfluorinated vinyl ether CF$_2$=CF—O—CF$_2$CF(CF$_3$)—O—CF$_2$CF$_2$SO$_2$F, perfluoro (3,6-dioxa-4-methyl-7-octenesulfonyl fluoride) (PDMOF), followed by conversion to sulfonate groups by hydrolysis of the sulfonyl halide groups and ion exchanging to convert to the desired form. One preferred polymer of the type disclosed in U.S. Pat. Nos. 4,358,545 and 4,940,525 has the side chain —O—CF$_2$CF$_2$SO$_3$H. This polymer can be made by copolymerization of tetrafluoroethylene (TFE) and the perfluorinated vinyl ether CF$_2$=CF—O—CF$_2$CF$_2$SO$_2$F, perfluoro(3-oxa-4-pentenesulfonyl fluoride) (POPF), followed by hydrolysis and ion exchange. Ion exchange is needed because sulfonyl fluoride is hydrolyzed in alkaline solution and a sulfonic acid salt results, such as potassium sulfonate, which is then ion-exchanged with acid to convert it to the sulfonic acid.

Additional sulfonated ionomers that can be used in conjunction with carboxylic acid polymer layers exist. For example, partially sulfonated poly(arylene)-etherketones membranes are known to the skilled in the art to be proton exchange membranes for fuel cells. Specific examples can be found in the literature (O. Savadogo, J. of New Materials for Electrochemical Systems, 1, 47-66, 1998). Other sulfonic acid ionomers are known and have been proposed for fuel cell applications. Polymers of trifluorostyrene bearing sulfonic acid groups on the aromatic rings are an example (U.S. Pat. No. 5,773,480). The trifluorostyrene monomer may be grafted to a base polymer to make the ion-exchange polymer (U.S. Pat. No. 6,359,019).

Polymers for use in accordance with the present invention are preferably fluorinated, more preferably highly fluorinated acid ionomers. "Fluorinated" means that at least 10% of the total number of univalent atoms in the polymer are fluorine atoms. "Highly fluorinated" means that at least 90% of the total number of univalent atoms in the polymer are fluorine atoms. Most preferably, the polymer is perfluorinated.

Ionomers used in membranes are ordinarily characterized by equivalent weight (EW), which is the weight of polymer in the hydrogen-ion or acid form in grams that will neutralize one equivalent of base. For TFE/PDMNM and TFE/PDMOF polymers described above, equivalent weights are in the range of about 700 to 1500, preferably about 800 to 1350, more preferably about 900 to 1200. Because equivalent weight is influenced by the molecular weight of the vinyl ether, an alternative way has been developed for characterizing ionomer ion exchange capacity independently of the molecular weight. This is the ion-exchange ratio (IXR). IXR is the number of carbon atoms in the polymer backbone divided by the number of ion-exchange groups. For the copolymer of TFE and vinyl ether (1), described above, IXR is related to equivalent weight (EW) by the equation: EW=50×IXR+308. The IXRs corresponding to the EW ranges given above are about 8 to 24, preferably about 10 to 21, more preferably about 12 to 18. The IXR applies regardless of how the ion-exchange group is attached to the polymer backbone. For the sulfonic acid ionomer from copolymerization of TFE and PDMOF, EW=50×IXR+344.

Reinforced exchange polymer membranes can also be used in the practice of the present invention. Reinforced membranes can be made by impregnating porous, expanded PTFE (ePTFE) with ion exchange polymer. ePTFE is available under the tradename Tetratex® from Tetratec, Feasterville Pa., and under the tradename Goretex® from W. L. Gore and Associates, Inc., Elkton Md. Impregnation of ePTFE with perfluorinated sulfonic acid ionomer is disclosed in U.S. Pat. Nos. 5,547,551 and 6,110,333 (also discloses bilayer membrane manufacture). Similar impregnation can be done using solutions of esters of carboxylic acid ionomers (U.S. Pat. No. 5,273,694) followed by hydrolysis and acid exchange as is known in the art. The reinforcement provides increased strength and permits use of thinner membranes, and also contributes to greater dimensional stability of the membrane.

As stated above, sulfonic acid ionomers are used in membrane fuel cells because of the facility with which these ionomers transport protons, i.e. sulfonic acid membranes have high proton conductivity. Carboxylic acid ionomers on the other hand, while conductive toward cations such as potassium and sodium, have been thought to be poor proton conductors and to show unacceptably high resistance in fuel cells.

It has now been discovered that when carboxylic acid ionomer membranes includes at least one Lewis base that is more basic than the carboxylate anion, the proton conductivity of the membrane is enhanced and the membrane shows acceptable conductivity in fuel cells. Another way of stating this is: the pKa of the protonated Lewis base is greater than the pKa of the carboxylic acid of the ionomer of the carboxylic acid membrane. Preferably, the pKa of the protonated Lewis base should be at least about 0.1 pKa unit greater, more preferably at least about 1 pKa units greater, most more preferably at least about 2 pKa units greater. The pKa of the protonated Lewis base preferably is less than about 14, more preferably less than about 11, most preferably less than about 8.

This invention uses the standard definition of pKa, which can be found in "*The Determination of Ionization Constants*" by Adrien Albert and E. P. Serjeant (page 4, Chapman and Hall, 1984). Therefore, the pKa is defined as the negative logarithm of the ionization constant, in this case, of the protonated base.

By Lewis base is meant an electron pair donor that is not the conjugate base of a Bronsted acid, that is, it is not a base formed when a Bronsted acid donates a proton. For example, hydroxide ion, the conjugate base of the Bronsted acid water, is not a Lewis base according to this invention. Similarly, acetate, the conjugate base of the Bronsted acid acetic acid, is not a Lewis base according to this invention.

The Lewis base of this invention is preferably an organic Lewis base. By organic is meant that the Lewis base contains at least one carbon atom that is covalently bonded to at least one atom of hydrogen, carbon, or nitrogen.

Lewis bases that are effective according to this invention include but are not limited to imidazoline (C$_3$H$_6$N$_2$), piperidine (C$_5$H$_{11}$N), piperazine (C$_4$H$_{10}$N$_2$), pyrrolidine (C$_4$H$_9$N), aziridine (C$_2$H$_5$N), azetidine (C$_3$H$_7$N), imidazole (C$_3$H$_4$N$_2$), pyrazole(C$_3$H$_4$N$_2$), and pyridine (C$_5$H$_5$N). Imidazoline and piperidine are preferred. The protonated form of these Lewis bases all have pKa higher than that of the carboxylic acid. These Lewis bases may be substituted, for example by alkyl or aryl groups, so long as such substitution does not alter their Lewis base character or change the pKas of the protonated forms of the Lewis bases so that the pKas do not exceed those of the acid groups in the ionomer membrane. Examples of such substituted forms include the alkyl and aryl substituted bases, for example, 2-methyl-2-imidazoline (C$_4$H$_8$N$_2$), 4,4- dimethyl-2-imidazoline ($C_5H_{10}N_2$), 2-ethyl-4-methylimidazole ($C_6H_{10}N_2$), 2,6-dimethylpyridine ($C_7H_9N$), and 2,6-dimethylpiperidine ($C_7H_{15}N$). Other substituted forms are known to those skilled in the art. Also effective are water soluble macromolecules including oligomers and polymers with the aforementioned Lewis base or their derivatives as the terminating groups of the main chain or the side chain.

When a Lewis base according to this invention is present in carboxylic acid membrane, at least some fraction of the Lewis base is protonated by the carboxylic acid, and therefore the Lewis base is in its protonated form. For example, if imidazole is used as the Lewis base, at least some of it is converted to the imidazolium ion.

It will be recognized that because of variations in copolymerization such as occur due to accidental or intentional changes in monomer feed rates, temperatures, and initiator feed rates, and in variations in polymer morphology due to thermal history, not all carboxylic acid groups will be in the same environment and therefore may have somewhat different pKas. Also, polymers may be made using two or more comonomers having carboxylic acid functionality or the precursor thereto. In this case too, the carboxylic acid groups will not have identical pKas. Furthermore, pKas of the acid groups as well as the protonated Lewis base(s) can be affected by the amount of water and methanol in the membrane and the temperature. Recognizing these variables, according to this invention, the pKa or the protonated form of the Lewis base need only be greater than the pKa of some of the carboxylic acid groups, preferably greater than 25 mol % of such groups, more preferably greater than 50 mol %, still more preferably greater than 75 mol %, and most preferably greater than 90 mol % of such carboxylic acid groups.

Except for the use of the carboxylic acid membrane and the use of the Lewis base additive and any additional components or modifications to accommodate the additive, conventional fuel cell materials and designs can be employed in the practice of the present invention.

The invention is advantageously employed in direct methanol fuel cells which includes a fuel supply for supplying a methanol fuel to the anode of the fuel cell. In the present application, "methanol fuel" refers to the fuel in contact with the anode and the membrane. "Fuel mixture" is methanol and Lewis base, with or without water. "Fuel supply" refers to the apparatus for supplying methanol fuel to the anode.

In one preferred form of the present invention, in which the methanol fuel for the fuel cell includes the additive and the membrane is contacted with the Lewis base of this invention by the Lewis base being present in the methanol fuel, the Lewis base selected should be soluble in the methanol fuel under the conditions of temperature and concentration at which the methanol fuel is used in the fuel cell. Similarly, for any fuel mixtures to be supplied to the fuel cell which incorporate the Lewis base, the Lewis base should be soluble in the fuel mixture at the desired concentration.

The concentration of the Lewis base in the methanol fuel is at least about 0.001 molar, preferably at least about 0.005 molar, and more preferably at least about 0.01 molar; no more than about 1.0 molar, preferably no more than about 0.5 molar, and more preferably no more than about 0.3 molar. The Lewis base may advantageously be premixed with the fuel mixture supplied to the fuel cell, in which case concentrations can be in the same preferred ranges as the methanol fuel, or may be added to the fuel mixture during operation of the fuel cell.

In another embodiment of the invention, the membrane is pretreated with Lewis base and incorporation of Lewis base in the methanol fuel is unnecessary, at least at the startup of the fuel cell. The Lewis base may be added to the membrane by dipping or soaking in, coating, or spraying with a solution of Lewis base. Membranes can also be pretreated with certain sufficiently volatile Lewis bases by vapor deposition. Alternatively, if the membrane is cast from solution, the Lewis base may be added to the solution before casting. This approach is particularly useful for hydrogen fuel cells, in which the introduction and maintenance of Lewis base in the membrane cannot be so easily achieved as when liquid methanol fuel is used. A way of continuously or intermittently introducing certain, sufficiently volatile Lewis bases into the membrane in a hydrogen fuel cell is by vapor deposition. The Lewis base is carried to the membrane in the hydrogen gas stream. Heat is advantageously applied as needed to ensure that the Lewis base has adequate vapor pressure so that the desired amount of Lewis base is carried to the membrane in a reasonable time.

Because optimum fuel cell performance, including as it does the acceptable level of methanol and water crossover as well as acceptable power output, depends upon the application, the optimum amount of additive will also vary with application. Fuel cells in which limited crossover is the most desirable attribute, will perform best with more additive. Fuel cells that are subject to high power demand, will perform best with lesser amounts of additive.

The amount of Lewis base in the membrane preferably is sufficient to react with about 10% of the acid groups in the membrane, assuming that the Lewis base reacts quantitatively with the acid group. That is, if the membrane contains one equivalent of ion exchange groups, then at least about 0.1 equivalent of Lewis base preferably is used. Note that the assumption of quantitative reaction is made for the purpose of defining the amount of Lewis base and not to define or limit to what extent if any, reaction occurs. More preferably at least enough Lewis base is present to react with about 25% of the acid groups in the membrane, still more preferably at least enough to react with about 50% of the acid groups in the membrane, even still more preferably at least enough to react with about 75% of the acid groups in the membrane, and most preferably at least enough to react with all of the acid groups in the membrane. If there is an excess of Lewis base, it should amount to no more than twice the number of equivalents of acid groups in the membrane, preferably no more than 1.5 times the number of equivalents of acid groups in the membrane, and more preferably no more than about 1.1 times the number of equivalents of acid groups in the membrane.

Because of the low methanol crossover in direct methanol fuel cells according to this invention, it is possible to use more concentrated methanol fuels. Conventional direct methanol fuel cells use methanol fuels containing about 1 to 6 weight percent (wt %) methanol in water. Direct methanol fuel cells according to this invention can operate with methanol fuels with about 0.1 to about 99 wt % methanol in water, preferably with about 0.1 to about 80 wt % methanol in water, more preferably with about 0.1 to about 64 wt % methanol in water, still more preferably about 1 to about 50 wt %, still more preferably about 5 to about 40 wt %, most preferably about 15 to about 30 wt %.

The methanol fuel for a direct methanol fuel cell in accordance with the invention can be supplied by a fuel supply which can be a single container, or it may made a plurality of containers from which feeds are mixed. For example, a three-container system could have separate containers of methanol, water, and Lewis base. A two-container system could have separate containers, one of methanol plus water, the other of Lewis base, or preferably Lewis base in methanol which may contain water. Water generated by the fuel cell can be a source of water for the fuel supply. Therefore, the fuel supply can be fed from a fuel concentrate which may contain up to 100% methanol or only methanol and the Lewis base additive. The concentrate is added to the operating fuel cell to keep the methanol fuel in desired concentration range.

The Lewis base is not consumed at the rate at which fuel is consumed in the fuel cells of this invention and therefore, depending upon operating conditions such as temperature and current density, the concentration of the Lewis base in the methanol fuel during operation may increase in the membrane and/or the fuel reservoir. In this event, the Lewis base concentration can be maintained by reducing the amount of Lewis base being added to the methanol fuel. In addition, the Lewis base may be added to the methanol fuel intermittently when operating conditions indicate a drop in performance. This process can be automated, for example, by monitoring the amount of methanol and water being consumed and using the monitor signal to control a metering system to add Lewis base to the methanol fuel as necessary to maintain performance. Alternatively, the Lewis base concentration may be adjusted to a level necessary to maintain lower water transport and methanol crossover or fuel cell performance. It will be recognized that "performance" is not a monolithic concept. In the case of fuel cells, according to circumstances, it may refer to crossover of methanol or water transport, to voltage, or to power output.

Because the amount of Lewis base in the fuel needed to "make up" or to maintain the desired steady-state concentration of Lewis base in the membrane may be less than needed at the start of operation, when the membrane may contain no Lewis base, the concentration of Lewis base in a fuel cell that is in operation may be lower.

The carboxylic acid group is a poor conductor of protons in the absence of Lewis bases as disclosed in this invention. Therefore, unlike sulfonic acid groups, there is no direct relation for carboxylic acid polymer membrane between IXR and conductivity. Lewis base is necessary to confer useful conductivity on the membrane. In view of this, it is preferable to have as low an ion exchange ratio in the carboxylic acid membrane as is consistent with cost of the membrane and the needed physical strength such as is measured by tensile strength (cost increases and physical strength decreases with increasing acid group content), that is with decreasing IXR. Other things being equal, carboxylic acid membrane with lower IXR will have a greater ultimate conductivity when an amount of Lewis base equivalent to the amount of carboxylic acid groups is present in the membrane. A fuel cell with such a membrane will have a greater operating range between minimum power-maximum resistance to water and methanol crossover, and maximum power-minimum crossover.

For portable devices powered by direct methanol fuel cells designed according to this invention, containers of fuel will be convenient for refueling the cell. The containers can be made from polymer or metal materials suitable for the fuel, i.e. having low permeation rate to the fuel components and being resistant to interaction with the fuel components. It is preferred that the container be substantially nonvitreous, that is, not made of glass or other vitreous material, though such material may comprise no more than about 10% of the total mass of the container, preferably no more than about 5%. Such containers will have at least one dispensing port, sealed by a cap or plug, or other sealing means, such as by a foil membrane, or preferably a septum of elastomeric material. The contents of the container may be used to fill the anode compartment of the fuel cell when fuel replenishment is necessary. Alternatively, the fuel cell can be designed to accept such containers, so they may be joined to the cell, replacing empty containers that have been removed. In either case, the container may hold a concentrated fuel mixture to which water is added to achieve the desired methanol fuel composition. The water may be in a separate compartment and may be water that is generated during operation of the fuel cell. In this respect, the containers may be used as disposable batteries are now used in devices such as flashlights and portable radios and may be used to provide an instant "recharge" for devices such as cell phones, portable computers, and portable digital assistants which currently employ rechargeable batteries.

EXAMPLES

Method of Measuring Membrane Conductivity

The membrane sample is loaded on a four point conductivity probe. The probe has a base plate that measures 1.9"× 1.5"×0.385" (4.8 cm×3.8 cm×0.978 cm) and a cover plate 1.9"×1.23"×0.25" (4.8 cm×3.1 cm×0.64 cm). Four 0.5" (1.3 cm) long platinum wires (30 GA, Hauser and Miller Precious Metals) are fixed on top of four 0.05" (0.13 cm) wide ridges along the width direction of the base plate. The outer two probes has a spacing of 1" (2.5 cm) and the inner two probes has a spacing of 0.4" (1 cm). In between the ridges, the space is open so that membrane is exposed to the environment. The membrane sample, typically 1 cm wide and 3.25 cm long is pressed against the four platinum probes with the cover plate by a clamp. The membrane is also exposed to the environment on the cover plate side, which also has the openings. The four platinum wires are connected electrically to a Solatron impedance measurement system consisting of a S11287 electrochemical interface and a 1255B frequency response analyzer. To measure the membrane conductivity, the probe is dipped into a 500 ml glass beaker filled with the desired solution so that the membrane is fully exposed to the solution. The glass beaker is wrapped with heating tape, which is connected to a digital thermal controller. The thermocouple of the controller is immersed in the solution so that the solution temperature is precisely controlled to within ±0.5° C.

Since the solution itself may have finite conductivity, it is important to correct for that in the measurement. This can be accomplished by measuring separately the resistances of the cell when the membrane sample is loaded (R) and when a thin Teflon® film is loaded ($R_0$). The resistance (Rs) due to the sample is then calculated by the formula: $Rs=R \times R_0/(R_0-R)$. And the sample membrane conductivity is calculated by the formula: $\sigma=L/(Rs \times A)$ where $\sigma$ is conductivity (S/cm), L (cm) is the spacing between the inner two wires and A ($cm^2$) is the cross sectional area of the membrane.

Methanol and Water Crossover (Permeation Rate Through Membrane)

The membrane samples are loaded in permeation cells (316 stainless steel, Millipore® high-pressure, 47 mm filters modified by the addition of liquid distribution plates). Each cell has a permeation area of 9.6 $cm^2$. The cells (up to 4 per run) are located inside an insulated box kept at constant temperature. The insulated box is heated by two Chromalox, 1100 watts, finstrips heaters. The air within the box is mixed by a 7" diameter, 5-blade propeller connected to a Dayton Model 4Z140 variable speed DC motor. The insulated box temperature is controlled by a Yokogawa UT320 Digital indicating temperature controller.

Methanol solution is circulated on the top side of the membrane at a flow rate of 5.7-9.6 cc/min (measured with Brook Instruments, Model 1355EYZQFA1G rotameters). The bottom of the membrane is swept with nitrogen at 1,000-5,000 standard cubic centimeters (sccm) (measured with mass flow controllers: 2 MKS type 1179 and 2 Tylan 2900 series mass flow meters connected by a Tylan RO-28 controller box). Both the methanol solution and the nitrogen are heated to the cell temperature by circulating through stainless steel coils before entering the permeation cells. Samples of the nitrogen sweeping the permeation cells are sent to a set of heated Valco valves and then a 2 cc gas sample is injected into a HP 6890 Gas Chromatograph with a Thermal Conductivity Detector (TCD) and HP-PLOT Q GC Column to analyze the methanol and water. The GC is controlled by HP Chem Station software Revision A.06.03.

The permeation rates (molar fluxes) of methanol and water through the membrane are calculated as:

---

Methanol Molar flux (mol/cm$^2$ min) = grams MeOH × F/ (Vnitrogen × Ap × MWMeOH)
Water Molar flux (mol/cm$^2$ min) = grams Water × F/ (Vnitrogen × Ap × MWWater)
Where:
grams MeOH = MeOH Peak Area × MeOH Response Factor = Grams methanol Injected in GC.
grams Water = Water Peak Area × Water Response Factor = Grams water Injected in GC.
Vnitrogen = Vs − grams MeOH /ρ MeOH − grams Water/ρ Water = Volume of nitrogen injected in GC (cm$^3$)
Vs = Volume Gas Sample injected in GC (cm$^3$)
Ts = Temperature of Gas sample = Temperature of sampling valve (° K.)
Ps = Pressure of gas sample (psia)
ρ Nitrogen = Density of nitrogen at Ts and Ps (g/cm$^3$)
ρ MeOH = Density of Methanol at Ts and Ps (g/cm$^3$)
ρ Water = Density of Water at Ts and Ps (g/cm$^3$)
Ap = Permeation Area of cells (cm$^2$)
F = Flow of nitrogen sweeping membrane at Ts, Ps (cm$^3$/min)

---

The methanol and water response factors are calculated by injecting known amounts of methanol and water into the GC. It is the ratio: grams of component injected/peak area.

Membrane Preparation Method

Carboxylic acid perfluoroionomer, a copolymer of TFE and PDMNM, in the form of pellets of equivalent weight 1054 is spread in a 2-mil thick chase and sandwiched between two sheets of Teflon® PFA film. This combination is inserted between two flat stainless steel plates and put in a Carver hotpress at 225° C. After heating for 3 minutes, 20,000 lbs force is applied for 1 minute. After removal from the hotpress, the combination is cooled and opened and the resulting film is cut out of the chase. The following procedure is used to convert the film from methyl ester form to the acid form:
1. Treat the film in 10 wt % aqueous KOH at 90° C. for 2 hours.
2. Replace the KOH solution with fresh one, and treat the membrane again at 90° C. in 10% KOH for 1 hour.
3. Rinse the membrane in nanopure water several times.
4. Treat the sample at 80° C. in 15% by volume aqueous HNO$_3$ solution for 2 hours and then repeat this process with fresh solution.
6. The film is then rinsed with nanopure water several times.
7. The film is then boiled in nanopure water for 1 hr.
8. Step 7 is repeated.

Example 1

A methanol fuel is made consisting of 0.2 molar imidazole in MeOH/H$_2$O (1:4 by wt). pKa(imidazolium)=7. A carboxylic acid (eq. wt. 1054) membrane is prepared as described above. Its thickness is 6.06 mils (154 μm). A sample is mounted on the conductivity probe. pKa(carboxylic acid)=2, thus pKa(protonated additive)>pKa(ionomer). The sample probe is placed in the beaker filled with solution at 60° C.

AC impedance is used to measure the conductivity. Correction is made to eliminate the background conductivity due to the solution itself. The conductivity of the membrane is 13.3 mS/cm.

MeOH and H$_2$O permeation rate of the carboxylic acid membrane is measured at 60° C., in the above solution. MeOH permeation rate is $2.37 \cdot 10^{-7}$ mol/(cm$^2$ min). Water permeation rate is $1.38 \cdot 10^{-6}$ mol/(cm$^2$ min).

Comparative Example A

Conditions are the same as Example 1 except that no imidazole is added to the methanol fuel. The conductivity of the membrane is 0.5 mS/cm. MeOH permeation rate at 60° C. is $3.34 \cdot 10^{-7}$ mol/(cm$^2$ min) and water permeation rate is $1.73 \cdot 10^{-6}$ mol/(cm$^2$ min). In the absence of fuel additive, the membrane is about 25 times less conductive.

Comparative Example B

Nafion® 117 (available from the DuPont Company, Wilmington Del. U.S.A.) is a sulfonic acid membrane made of a copolymer of TFE and PDMOF, having an equivalent weight of about 1050, and a thickness of about 7 mils (180 μm). Its crossover properties are measured in MeOH/H$_2$O (1:4 by wt) methanol fuel. MeOH permeation rate at 60° C. is $6 \cdot 10^{-5}$ mol/(cm$^2$ min) and that of water is $5.7 \cdot 10^{-4}$ mol/(cm$^2$ min). By comparison with Example 1, it can be seen that permeation rate to methanol is lower for the carboxylic acid membrane by about 200 times, and permeation rate to water by about 300 times.

Example 2

A direct methanol fuel cell is operated with a bilayer membrane made by coextrusion of a TFE/PDMOF copolymer and a TFE/PDMNM copolymer, followed by conversion to acid form by the hydrolysis and acid exchange steps described in membrane preparation methods. The carboxylic acid ionomer layer is 0.1 mil thick with EW in the range of 940 to 1055. The sulfonic acid ionomer layer is 3.5 mil thick with EW in the range of 1000 to 1100. The cell active area is 5 cm$^2$. The anode catalyst layer is comprised of 4 mg/cm$^2$ Pt/Ru (1:1 atom ratio) black and 0.5 mg/cm$^2$ perfluorosulfonic acid. The cathode catalyst is comprised of 4 mg/cm$^2$ Pt black and 0.5 mg/cm$^2$ perfluorosulfonic acid. The anode catalyst is applied on the carboxylic acid ionomer side and the cathode catalyst on the sulfonic acid ionomer side of the membrane. The cell body is made of polytetrafluoroethylene and is comprised of an anode compartment that measures 4 cm×3 cm×2.5 cm. The cathode compartment is open to the environment to allow access to air. Operating temperature is 30° C. The fuel is a fuel mixture containing methanol (20 wt %) and 0.05M imidazole in water. The cell with this fuel achieved open circuit voltage of 0.78±0.02 V and current of 0.12±0.02 mA at cell voltage of 0.3V.

What is claimed is:
1. A fuel cell comprising anode and cathode and an ionomer membrane having carboxylic acid groups separating said anode and cathode, said membrane comprising at least one Lewis base, at least some of which is in its protonated form, said protonated form having a pKa greater than the pKa of at least some of said carboxylic acid groups, said fuel dell being a direct methanol fuel cell and futher comprising a fuel supplying methanol fuel comprised of methanol, water and said Lewis base to said anode.

2. The fuel cell of claim 1 wherein the amount of methanol in the methanol fuel is about 0.1 to about 99 wt %.

3. The fuel cell of claim 1 wherein said Lewis base comprised in said methanol fuel has a concentration of at least about 0.001 M.

4. A process for operating a fuel cell comprising anode and cathode, a membrane having carboxylic acid groups separating said anode and cathode, and fuel supply for supplying fuel to said anode, said process comprising contacting said membrane with a Lewis base that in its protonated form has a pKa greater than the pKa of at least some of said carboxylic acid groups, said fuel cell being a direct methanol fuel cell and said fuel supply supplying methanol fuel to said anode, said contacting of said membrane with Lewis base being carried out by incorporating said at least one Lewis base as an additive to said methanol fuel at some time during startup or operation the fuel cell.

5. The process of claim 4 wherein said at least one Lewis base in said methanol fuel has a concentration of at least about 0.001 M.

6. The process of claim 4 wherein said at least one Lewis base is present as an additive in the fuel at the startup of the fuel cell.

7. The process of claim 4 wherein said at least one Lewis base is present as an additive in the methanol fuel during operation of the fuel cell.

* * * * *